United States Patent [19]

Swift et al.

[11] Patent Number: 5,336,744

[45] Date of Patent: Aug. 9, 1994

[54] PROCESS FOR POLYMERIZATION OF ITACONIC ACID

[75] Inventors: Graham Swift, Blue Bell; Kathryn M. Yocom, Oreland, both of Pa.

[73] Assignee: Rohm and Haas Company, Philadelphia, Pa.

[21] Appl. No.: 32,221

[22] Filed: Mar. 17, 1993

[51] Int. Cl.$^5$ ............................................. C08F 22/02
[52] U.S. Cl. ................................... 526/318.2; 526/93; 526/90
[58] Field of Search ..................... 526/318.2, 90, 93

[56] References Cited

U.S. PATENT DOCUMENTS

| | | | |
|---|---|---|---|
| 3,132,122 | 5/1964 | Dunay et al. | 526/90 |
| 3,281,497 | 10/1966 | Joo et al. | 526/90 |
| 3,846,383 | 11/1974 | Uyama et al. | 526/90 |
| 3,875,099 | 4/1975 | Kurth et al. | 526/78 |
| 4,879,364 | 11/1989 | Stanislawczyk | 526/318.2 |
| 5,100,980 | 3/1992 | Hughes et al. | 526/318.2 |

*Primary Examiner*—Joseph L. Schofer
*Assistant Examiner*—N. Sarofin
*Attorney, Agent, or Firm*—Marvin J. Powell; David T. Banchik

[57] ABSTRACT

Polymers of itaconic acid are formed at high conversion by an aqueous polymerization process of partially neutralized monomer solution, water, polyvalent metal ion and initiator.

Polymers produced according to the process of the invention are useful as detergent additives, scale inhibitors and removers, sequestrants, yarn sizers, deflocculating agents, de-inking agents, suspending agents and dispersing agents.

8 Claims, No Drawings

PROCESS FOR POLYMERIZATION OF ITACONIC ACID

FIELD OF THE INVENTION

This invention relates to the preparation, at high conversion, of polymers of itaconic acid. This invention more particularly relates, to a novel process for the preparation of polymers of itaconic acid carried out with partially neutralized itaconic acid, an initiator, and a polyvalent metal ion.

Polymers made by this process are suitable for use as detergent additives, scale inhibitors and removers, sequestrants, yarn sizers, deflocculating agents, de-inking agents, suspending agents and dispersing agents.

DESCRIPTION OF RELATED ART

Marvel and Shepherd, in the *Journal of Organic Chemistry*, vol. 24, pp. 599–605 (1959), describe the first polymerization of itaconic acid in dilute hydrochloric acid, using potassium persulfate as the catalyst. However, the problem with this polymerization process was that it took a number of days to complete the process, and conversion of the itaconic acid was only 35 percent. This means that 65 percent of the itaconic acid remained unpolymerized. This made the process commercially unacceptable.

Nakamoto, Ogo and Imoto, in *Chemie III*, pp. 104–114 (1968), describes radical polymerization of itaconic acid in various solvents under high pressure, 5000 $kg/cm^2$. However, the polymerization process resulted in a 50 percent conversion and required specialized equipment. This made the process costly and commercially unfeasible.

U.S. Pat. No. 3,560,529 describes the polymerization of itaconic anhydride. This patent claims to have resolved two problems: (1) it identified a suitable initiator and; (2) the process could be practiced under ambient conditions without the need of costly pressurized equipment. However, conversion of itaconic acid was found to be erratic, unreliable and inconsistent.

U.S. Pat. No. 3,055,873 describes a method of polymerizing monoalkyl itaconate with subsequent hydrolysis of the poly(monoalkyl itaconate) and finally the precipitation of the itaconic acid. However, the process resulted in 75 percent conversion, leaving 25 percent of the monomer unpolymerized.

Problems to be Addressed

Although several processes for the preparation of polymers of itaconic acid are known, these processes have an inherent difficulty in polymerizing this dicarboxylic acid—low polymerization conversion of the acid continues to be a problem. High levels of unpolymerized monomer in the final product raise serious environmental concerns and cause significant application problems.

Additionally, many of the processes are known to be difficult, erratic, inconsistent and in one instance where a detonatable initiator is employed, hazardous to practice.

The present invention seeks to overcome problems attributed to the prior related process for the polymerization of itaconic acid.

SUMMARY OF INVENTION

According to one aspect of the invention is provided an aqueous polymerization process for the preparation, at high conversion, of polymers of itaconic acid.

According to another aspect of the invention is provided a polymer produced by an aqueous polymerization process which comprises adding itaconic acid and a polyvalent metal ion to a reactor initially charged with water, adding sodium hydroxide for partial neutralization of the itaconic acid and, subsequently, adding under uniform addition rates an initiator solution.

ADVANTAGES OF INVENTION

While several processes have made significant improvements in the production of polymers of itaconic acid, further improvements are required. It is therefore an advantage of the present invention to produce polymers of itaconic acid at high conversion. Another advantage of the present invention is to complete the polymerization in a significantly shorter period of time and with relative ease and consistency. Still another advantage of the present invention is to produce environmentally acceptable itaconic acid polymers having low residual monomers in the final product.

DETAILED DESCRIPTION OF THE INVENTION

According to one aspect of the invention is provided polymers produced by an aqueous polymerization process which comprises adding itaconic acid and a polyvalent metal ion to a reactor initially charged with water, adding a base for partial neutralization of the itaconic acid and, subsequently, adding under uniform addition rates an initiator solution.

Polymers produced according to the process of the present invention are useful as detergent additives, scale inhibitors and removers, sequestrants, yarn sizers, deflocculating agents, de-inking agents, suspending agents, dispersing agents and hard surface cleaners.

A critical aspect of the present invention is the partial neutralization of the itaconic acid monomer solution prior to conducting the polymerization reaction. "Partial neutralization" requires less than two moles of base neutralizer for each mole of itaconic acid. For example, less than two moles of sodium hydroxide are required to partially neutralize one mole of itaconic acid. However, when a divalent base is used to partially neutralize itaconic acid, such as, for example, calcium hydroxide, less than one mole is required to partially neutralize each mole of itaconic acid.

Any base may be used to partially neutralize itaconic acid to its itaconate salts. Organic materials such as amines may be used as neutralizers. Bases that are useful in neutralizing the monomer solution of this invention include all bases, such as, for example, hydroxides or carbonates of alkali metals such as sodium, potassium, and lithium and the like; ammonia, the alkylamines, such as monomethylamines, dimethylamines, trimethylamines, monoethylamine, diethylamine, triethylamine, and the like; the alkanolamines such as monoethanolamine, and dimethylethanolamine, and the like; and pyridine, and the like.

Among those bases listed above, the hydroxides and carbonates of alkali metals are especially preferred. They are inexpensive and readily available.

The itaconic acid is partially neutralized with a base from about 5 equivalent percent to about 50 equivalent percent based on the total acid groups in the itaconic acid, preferably the itaconic acid is neutralized from about 10 equivalent percent to about 40 equivalent percent. The partially neutralized itaconic acid is prepared by adding the neutralizer to a reactor containing an initial charge of deionized water, itaconic acid, and a polyvalent metal ion. Since the addition of the neutralizer may result in an exothermic reaction where heat is emitted, the neutralizer should be added slowly to the reactor or the reactor may be cooled with ice while slowly adding the neutralizer. The resulting monomer solution of itaconic acid is partially neutralized.

Initiators that are useful in the process of this invention are water-soluble and may be prepared in solution by dissolving the initiator in deionized water. Water-soluble initiators useful in the present invention include persulfate salts such as ammonium persulfate, sodium persulfate and potassium persulfate including mixtures and solutions thereof. Also useful are hydrogen peroxides, organic peroxides such as tertiary-butyl hydroperoxide as well as water soluble azo compounds such as 2,2'-azobis(2-aminozinopropane) hydrochloric acid salts. The method used to supply the initiator into the reactor is not critical and may be carried out by a one-time addition to the partially neutralized monomer solution, the polyvalent ion and water, or by gradual and uniform addition rates during the polymerization process. The preferred method of supplying the initiator is by gradual and uniform addition rates to the reactor containing the partially neutralized monomer solution, water, and the polyvalent ion.

The concentration of the initiator is from about 5 to about 50 percent by weight of active initiator on monomer, preferably from about 20 percent to about 40 percent by weight of the total monomer concentration. The preferred initiator is hydrogen peroxide.

Polyvalent ions useful in the process of the present invention are water-soluble metal compounds or simple substances. The polyvalent metal ion is not especially limited in the form being supplied to the polymerization process. If the polyvalent ion is capable of ionizing in a polymerization system, it can be fed as a polyvalent metal compound or as a simple substance, such as metal salts of vanadium oxytrichloride, vanadium trichloride, vanadyl oxalate, vanadylsulfate, anhydrous vanadic acid ammonium metavanadic acid, ammonium hypovanadous sulfate (($NH_4)_2SO_4$ $VSO_4 6H_2O$), ammonium vanadous sulfate ($NH_4)_2SO_4$ $VSO_4 12$ $H_2O$), cupric acetate, cupric bromide, cupric acetyl acetate, ammonium cupric chloride, cupric carbonate, cupric chloride, cupric citrate, cupric formate, cupric hydroxylic acid, cupric nitrate, cupric naphthenic add, cupric oleinic acid, cupric maleate acid, cupric phosphate, cupric sulfate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate, ferric pyrophosphate, and the like; polyvalent metal oxides such as vanadium pentoxide, cupric oxide, ferrous oxide, ferric oxide and the like; polyvalent metal sulfides such as cupric sulfide, ferric sulfide, ferrous sulfide and the like; and other polyvalent metal ions such as copper powder, iron powder and the like.

The concentration of the polyvalent metal ion is from about 0.00002 percent (0.2 parts per million (ppm)) to about 0.05 percent (500 ppm) based on the weight of the monomer, preferably from about 0.0001 percent (1 ppm) to about 0.005 percent (50 ppm) based on the weight of the monomer. The preferred polyvalent metal ion is ferric ammonium sulfate.

Polymerization temperatures that are useful in polymerization of partially neutralized itaconate salts are from about 50 degrees centigrade to about 200 degrees centigrade. The polymerization temperature used in the process of this invention is preferably in a range of from about 80 degrees centigrade to about 150 degrees centigrade and most preferably from about 90 degrees centigrade to about 120 degrees centigrade. These temperatures allow the polymerization of the itaconate salt to be completed in a time of about three to four hours, which is significantly shorter than polymerization processes disclosed above under related art. The polymerization is run from about 20 percent to about 90 percent solids, and most preferably from about 30 percent to about 70 percent solids.

Polymers produced according to the process of this invention are useful as detergent additives since they prevent redeposition of soil during laundering. The polymers are also effective when added to detergent compositions based on surfactants, including anionic, nonionic, zwitterionic, ampholytic surfactants and mixtures thereof; builders, including zeolites, silicates, carbonates, phosphates, perborates and mixtures thereof; and, optionally, adjuvants such as perfumes, colorants, fatty acids, fluorescent whiteners, opacifiers and the like.

Additionally, the polymers of this invention form clear, tough films, and can be applied from aqueous solutions in the sizing of yarn to impart abrasion resistance for weaving. The film is then removed from the yarn after weaving by dissolving the polymer with water.

Polymers of the present invention are also suitable as deflocculating agents for paper making. They may also be used as deinking agents in newspaper repulping and as dispersing agents in latex paints, ceramics and glazes.

The polymers of the present invention may be used as suspending agents for aqueous insecticide emulsions since their adhesive properties help to hold the insecticide on the treated surface.

Polymers of the present invention may be further used as scale inhibitors and dispersants for water treatment applications and are especially useful inhibitors for barium sulfate precipitation in oil well drilling applications.

Polymers produced according to the process of the present invention can also be used as dispersants for inorganic particulates, such as kaolin clay, calcium carbonate, zeolites, titanium dioxide and the like.

Polymers produced according to the process of the present invention result in a high conversion of the partially neutralized monomer solution. With significantly less unpolymerized monomer remaining in the final product, environmental concerns are minimized, and application performance of the final product is improved.

In addition, the novel process of the present invention is completed over a shorter period of time, when compared to related art processes, and is accomplished with relative ease and consistency.

Also, high conversion of the itaconic acid will lower the cost of production by reducing the amount of wasted unpolymerized monomer remaining in the final product.

The examples provided below are intended to illustrate the process of the invention that produces polymers of itaconic acid at high conversion, while using a process that is relatively easy to practice and with polymerization of partially neutralized itaconic acid occurring over a shorter period of time when compared to related art processes.

The examples are intended to further illustrate the present invention and should not be interpreted in any way to limit the scope of the invention, except as herein defined by the claims.

EXAMPLE I

To a 1 liter, 4-neck round bottom flask equipped with a mechanical stirrer, condenser, thermometer and an inlet for the addition of initiator and neutralizer was added 271 grams of itaconic acid, 85 grams of deionized water and 0.04 grams of ferric ammonium sulfate 12-hydrate solid. The contents of the flask were then set to stir and 66.6 grams of 50% sodium hydroxide (to give 20 equivalent percent neutralized itaconic acid) was added slowly. The reaction was then allowed to reflux. An initiator solution of 264.8 grams of 30% hydrogen peroxide was prepared and then added over three hours at reflux. The reaction was then held for 60 minutes at reflux, then cooled and packaged.

The resultant polymer solution showed 99.9 percent conversion of the itaconic acid. Unpolymerized residual itaconic acid content was 0.01 percent of the resulting solution. The resultant polymer had a solids content of 38.02 percent and a pH of 3.59. Based on gel permeation chromatography (GPC), the weight average molecular (Mw) was 1920, and the number average molecular weight (Mn) was 1730.

EXAMPLE II

To a 1 liter, 4-neck round bottom flask equipped with a mechanical stirrer, condenser, thermometer and an inlet for the addition of initiator and neutralizer was added 200 grams of itaconic acid, 84 grams of deionized water and 0.03 grams of ferric ammonium sulfate 12-hydrate solid. The contents of the flask were then set to stir and 49.2 grams of 50% sodium hydroxide (to give 20 equivalent percent neutralized itaconic acid) was added slowly. The reaction was then allowed to reflux. An initiator solution of 200 grams of 30% hydrogen peroxide was prepared and then added over three hours at reflux. The reaction was then held for 60 minutes at reflux. Then cooled and packaged.

The resultant polymer solution showed at least 99.9 percent conversion of the itaconic acid. Unpolymerized residual itaconic acid content was 0.01 percent of the resulting solution. The resultant polymer had a solids content of 38.07 percent and a pH of 3.61. Based on gel permeation chromatography (GPC), the weight average molecular (Mw) was 1830, and the number average molecular weight (Mn) was 1650.

EXAMPLE III

The procedure for Example II was repeated except 117.98 grams of deionized water was charged to the flask. The initiator solution contains 66.6 grams of 30% hydrogen peroxide and 100 grams of deionized water.

The resultant polymer solution showed at least 99.9 percent conversion of the itaconic acid. Unpolymerized residual itaconic acid content was 0.04 percent of the resulting solution. The resultant polymer had a solids content of 35.44 percent and a pH of 3.72. Based on gel permeation chromatography (GPC), the weight average molecular (Mw) was 2020, and the number average molecular weight (Mn) was 1780.

EXAMPLE IV

The procedure for Example II was repeated except 70.0 grams of deionized water was charged to the flask. The initiator solution contains 333.3 grams of 30% hydrogen peroxide.

The resultant polymer solution showed at least 99.9 percent conversion of the itaconic acid. Unpolymerized residual itaconic acid cent was no more than 0.01 percent of the resulting solution. The resultant polymer had a solids content of 26.89 percent and a pH of 3.47. Based on gel permeation chromatography (GPC), the weight average molecular (Mw) was 1550, and the number average molecular weight (Mn) was 1380.

EXAMPLE V

The procedure for Example II was repeated except 70.0 grams of deionized water and 0.08 grams of ferric ammonium sulfate 12-hydrate were charged to the flask. The initiator solution contains 333.3 grams of 30% hydrogen peroxide.

The resultant polymer solution showed at least 99.9 percent conversion of the itaconic acid. Unpolymerized residual itaconic acid content was no more than 0.01 percent of the resulting solution. The resultant polymer had a solids content of 27.29 percent and a pH of 3.59. Based on gel permeation chromatography (GPC), the weight average molecular (Mw) was 1440, and the number average molecular weight (Mn) was 1290.

EXAMPLE VI

The procedure for Example II was repeated except 117.98 grams of deionized water was charged to the flask. The initiator solution contains 33.3 grams of 30% hydrogen peroxide and 113.3 grams deionized water was prepared.

The resultant polymer solution showed at least 99.9 percent conversion of the itaconic acid. Unpolymerized residual itaconic acid content was 0.01 percent of the resulting solution. The resultant polymer had a solids content of 36.15 percent and a pH of 3.70. Based on gel permeation chromatography (GPC), the weight average molecular (Mw) was 2170, and the number average molecular weight (Mn) was 1900.

TEST PROCEDURES AND APPLICATION RESULTS

Soil Removal and Anti-Redeposition Performance Evaluation.

The efficacy of poly(itaconic acid) for clay soil removal and anti-redeposition was evaluated by washing soiled cotton and cotton/terry blended fabrics in the detergent formulation shown in Table I.

Cotton cloth #405 was purchased from Test Fabrics, Inc. (Middlesex, N.J.) and cut to a specified size (3½"×4½"). The cloths were then soiled by applying from 0.9 to 1.1 grams of a 50% clay slurry (in water) using a China bristle brush (#10). The soil was "painted" onto the cloth inside a 2' diameter circle and allowed to air dry overnight prior to laundering. The clay used to soil the cloths was a reddish-brown particulate clay.

The detergent compositions were tested in a Terg-o-Tometer at the following conditions; 40° C., 100 rpm, 100 ppm hardness (50% city tap water/50% de-ionized water), 12 minute wash with one 3 minute rinse, 1300 ppm detergent and 5 cloths per pot (3 of them soiled). The wash water was pre-heated, the fabric swatches were added and then dissolved detergent (2.6 grams of a 50% slurry in 100 milliliters water) was added. Following the wash period the swatches were wrung, and following the rinse cycle the swatches were wrung again and then air dried. Swatches washed in a detergent containing no polymer were always run as a control.

Reflectance was measured using a Pacific Scientific Colorimeter (Colorgard System 1000) and the data recorded using the L,a,b color scale. Detergency values (E), a measure of soil removal, and whiteness index (W.I.), a measure of anti-redeposition, are calculated as:

$$E = ((L_S - L)^2 + (a_S - a)^2 + (b_S - b)^2)^{0.5}$$

$$W.I. = (L/100)*(L - (5.715*b))$$

where $L_S$, $a_S$, and $b_S$ are the reflectivity reading for the soiled swatches and L,a,b are the reflectivity readings for the washed swatches. Each polymer was evaluated in three separate washing experiments. The detergent composition and levels of the components in parts by weight ("pbw") are shown in Table I. This composition was used for the above described performance evaluation and the results of the detergent performance evaluation are listed in Table III. The reflectance of the soiled cloths was measured before laundering so that only cloths of the same reflectance were used in a test. Reflectance was then measured after laundering to evaluate the efficacy of the poly(itaconic acid) in the detergent. The values reported in Table III are the average of the change in detergency and whiteness index of three cloths relative to the control cloths laundered in detergent not containing polymer. Positive numbers indicate an increase in detergency or whiteness index.

Additional detergent formulations representative, but not limited to possible formulations in which poly(itaconic acid) may be used, are shown in Table II.

TABLE I

| WASH CONDITIONS | |
| --- | --- |
| APPARATUS - | Terg-o-tometer washing machine |
| AGITATION - | 100 revolutions per minute |
| TEMPERATURE - | 40° C. |
| WATER HARDNESS - | 100 parts per million ("ppm") |
| WASH CYCLE - | 12 minutes |
| RINSE CYCLE - | 3 minutes |
| WATER LEVEL - | 1 liter |
| DETERGENT DOSAGE - | 1300 ppm |
| BALLAST - | 5 cloths per load (3 soiled/2 unsoilded) |

TABLE II

Detergent Composition Used to Evaluate Polyitaconic acid for Soil Removal and Anti-Redeposition

| Detergent Components | pbw |
| --- | --- |
| sodium carbonate | 22.0 |
| zeolite A | 16.0 |
| sodium silicate | 2.7 |
| linear alkyl sulfonate | 8.3 |
| lauryl sulfate | 8.3 |
| sodium sulfate | 34.0 |
| poly(itaconic acid) | 3.0 |

TABLE III

| Sample ID | Detergency | Whiteness Index |
| --- | --- | --- |
| *Control | 0 | 0 |
| Example 2 | 1.8 | 11.5 |
| Example 3 | 1.9 | 10.1 |
| Example 4 | 1.7 | 9.5 |
| Example 5 | 1.8 | 9.2 |
| Example 6 | 1.9 | 10.5 |

*Contained no poly(itaconic acid)
(Example 1 was not tested)

We claim:

1. A process for preparing homopolymers of itaconic acid comprising:
   (a) adding an initial charge of a monomer solution of itaconic acid water and a polyvalent metal ion to a reactor wherein the polyvalent metal ion is ferric ammonium sulfate at a level of from about 0.2 ppm to about 0.05 ppm percent by weight based on the weight of the total monomer;
   (b) adding a base for partial neutralization of the monomer solution; and,
   (c) adding under uniform addition rates an initiator solution.
   (d) running the reactor at a temperature sufficient to produce polymers of itaconic acid.

2. The process of claim 1 wherein the degree of partial neutralization of the itaconic acid is from about 5 equivalent percent to about 50 equivalent percent based on the total acid groups content of itaconic acid.

3. The process of claim 1 wherein the initiator solution is cofed into the initial charge linearly and as a separate solution during the polymerization process.

4. The process of claim 1 wherein the initiator concentration ranges from about 5 percent to about 50 percent by weight of the total monomer concentration.

5. The process of claim 4 wherein the initiator is selected from the group consisting of sodium persulfate, potassium persulfate, ammonium persulfate, sodium perphosphates, potassium perphosphates, ammonium perphosphates, tertiary butyl hydrogen peroxide and hydrogen peroxide.

6. The process of claim 5 wherein the initiator is hydrogen peroxide.

7. The process of claim 1 wherein the polymerization is run at solids levels in the range from 20percent to about 90 percent solids by weight based on the total weight of the monomer.

8. The process of claim 1 wherein the preferred polyvalent ion is an iron salt.

* * * * *